United States Patent [19]

Matsumoto et al.

[11] Patent Number: 4,640,863
[45] Date of Patent: Feb. 3, 1987

[54] MAGNETIC RECORDING MEDIA

[75] Inventors: Yukio Matsumoto; Masaru Hanayama, both of Mito, Japan

[73] Assignee: Victor Company of Japan, Ltd., Japan

[21] Appl. No.: 605,673

[22] Filed: Apr. 27, 1984

[30] Foreign Application Priority Data

Apr. 30, 1983 [JP] Japan ................................. 58-77124

[51] Int. Cl.$^4$ .............................................. G11B 5/70
[52] U.S. Cl. .................................... 428/323; 360/134; 360/135; 360/136; 427/128; 428/328; 428/694; 428/900; 428/480
[58] Field of Search ............... 428/694, 900, 910, 323, 428/141, 142, 328, 480; 427/41, 131, 128; 360/134-136

[56] References Cited

U.S. PATENT DOCUMENTS

| 4,348,446 | 9/1984 | Mitsuishi | 428/694 |
| 4,497,865 | 2/1985 | Minami | 428/694 |
| 4,521,480 | 6/1985 | Fujiki | 428/694 |
| 4,532,178 | 7/1985 | Matsumoto | 428/694 |

FOREIGN PATENT DOCUMENTS 1298562 7/1970 Fed. Rep. of Germany .

Primary Examiner—Ellis P. Robinson
Attorney, Agent, or Firm—Lowe, Price, LeBlanc, Becker & Shur

[57] ABSTRACT

A magnetic recording medium comprising a flexible support and a magnetic layer formed on the flexible support. The flexible support is made of a resin composition which comprises thermoplastic resins and particles of titanium monoxide or dititanium trioxide. The particles are dispersed in the thermoplastic resin in an amount of 0.03 to 10 wt % of the composition and have an average size below 2.5 μm.

3 Claims, 1 Drawing Figure

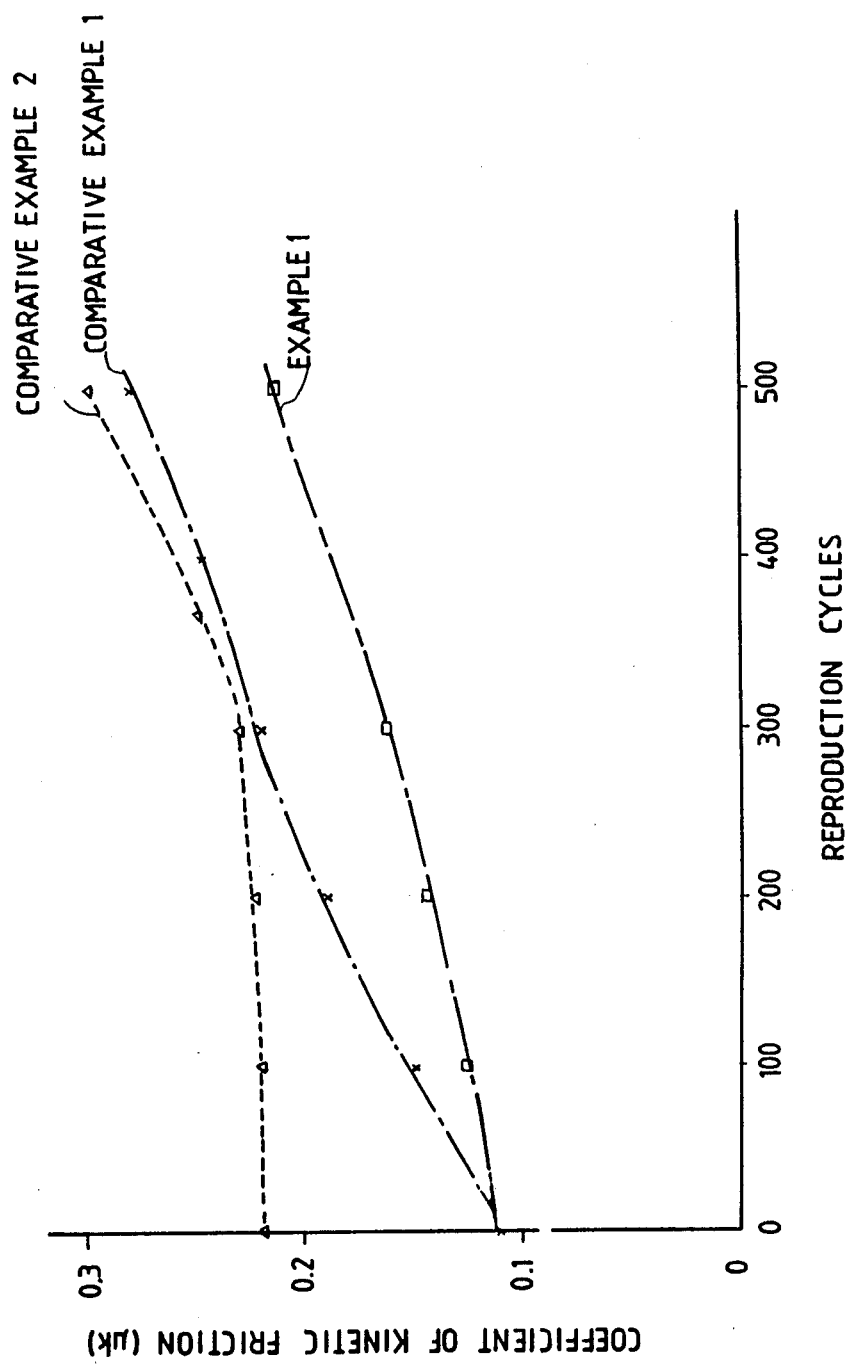

MAGNETIC RECORDING MEDIA

BACKGROUND OF THE INVENTION

1. Field of the Invention

This invention relates to information playback systems and more particularly, to an improvement in magnetic recording media such as magnetic video or audio tapes.

2. Description of the Prior Art

Magnetic tapes are usually made smooth on the surfaces thereof in order to attain good electromagnetic characteristics. At the same time, they are required to have a certain level of friction coefficient sufficient to achieve good travelling performance.

Several attempts to satisfy the requirements for smoothness and travelling performance which oppose each other have been made. In one such attempt, magnetic tapes are made irregular on one surface where no magnetic layer is formed. This may be achieved by coating a magnetic tape with a suitable resin composition on the back surface thereof. However, the back coating procedure requires an additional step which increases production cost and labor. In addition, uniform formation of the back coat layer is difficult and thus not practical.

Another attempt is to incorporate inactive materials such as aluminium silicate, calcium carbonate, calcium phosphate, silica or the like in base films. However, this is not satisfactory in improving both electromagnetic characteristics and travelling performance at the same time.

SUMMARY OF THE INVENTION

It is accordingly an object of the present invention to provide magnetic recording media which have excellent electromagnetic characteristics and travelling performance.

It is another object of the invention to provide magnetic recording media which comprise a non-magnetic substrate dispersing titanium monoxide or dititanium trioxide particles therein whereby wear resistance of the media is improved with dropouts being reduced in number.

The above objects can be achieved, according to the invention, by a magnetic recording medium which comprises a flexible support and a magnetic layer formed on the flexible support, the flexible support being made of a resin composition which comprises a thermoplastic resin and titanium monoxide or dititanium trioxide particles which are dispersed in the thermoplastic resin in an amount of 0.03 to 10 wt% of the composition and have an average size below 2.5 $\mu$m. By the dispersion of the titanium monoxide or dititanium trioxide particles, the magnetic recording medium is much improved in electromagnetic characteristics, travelling performance and wear resistance. The magnetic recording medium is made simply at a low cost because an additional vacuum evaporation or coating step as is needed in prior art techniques is not necessary.

BRIEF DESCRIPTION OF THE DRAWING

A sole FIGURE is a graphical representation showing the relation between the number of travelling cycles of a magnetic tape and coefficient of kinetic friction.

DETAILED DESCRIPTION AND PREFERRED EMBODIMENTS OF THE INVENTION

Titanium oxides useful in the present invention include titanium monoxide and dititanium trioxide. In practice, these oxides are powdered to have an average size not larger than 2.5 $\mu$m, preferably from 0.05 to 1.0 $\mu$m and most preferably from 0.05 to 0.5 $\mu$m. The oxide powder is mixed with a thermoplastic resin to uniformly disperse the powder therein. Subsequently, the mixture is formed into a film or sheet with a suitable thickness by any known techniques such as cast, injection or extrusion molding. This type of film or sheet is used as a support for the magnetic recording medium of the invention.

Upon the mixing, the oxide powder is used in an amount of from 0.03 to 10 wt% of the mixture. This range of amount enables the magnetic recording medium to have well-balanced electromagnetic characteristics and travelling performance. The mixing of the oxide powder and thermoplastic resin may be effected as usual by, for example, a Henschel mixer or the like.

The thermoplastic resins are those which are ordinarily used for these purposes and include, for example, polyesters such as polyethylene terephthalate, polyamides, polyolefins such as polyethylene, polypropylene and the like, cellulose derivatives such as methyl cellulose, acetyl cellulose, ethyl cellulose and the like.

On the support is formed a magnetic recording layer made of any known magnetic resin compositions. Typical magnetic resin compositions comprise magnetic particles dispersed in resin binders. These magnetic particles and resin binders are well known and described briefly.

Useful magnetic materials include, for example, ferromagnetic iron oxides such as gamma-$Fe_2O_3$ and $Fe_3O_4$ with or without additional metals such a Co, Ni, Mn and the like, ferromagnetic metal such as Fe, Co, Ni, and alloys thereof. These metals or alloys may include additional metals such as Al, Cr, Mn, Cu and the like.

Binders for these magnetic materials may be any known thermoplastic resins, thermosetting resins, and mixtures thereof. Representative examples of the thermoplastic resins include copolymers of vinyl chloride and monomers copolymerizable with vinyl chloride such as vinyl acetate, vinylidene chloride, acrylic ester-styrene copolymers, methacrylic ester-styrene copolymers, acrylic ester-vinylidene copolymers, urethane elastomers, cellulose derivatives, and various other synthetic rubbers. Examples of the thermosetting resins include phenolic resins, epoxy resins, alkyd resins, silicone resins, urea-formaldehyde resins, mixtures of isocyanates and polyols, and the like. These binder resins, both thermoplastic and thermosetting, may be used singly or in combination.

In the fabrication of magnetic recording media, magnetic materials are dispersed in resin binders dissolved in solvent. The resulting dispersion is applied onto a support including dispersed therein the oxide powder as described before, followed by drying, calendering and slitting into tapes with a predetermined width by ordinary techniques. The dispersion may further comprise any known additives such as dispersants, lubricants, abrasive agent, anti-static agents, surfactants and the like.

The present invention is particularly described by way of examples wherein the following example method is performed to produce the magnetic recording medium:

One hundred parts by weight of gamma-Fe$_2$O$_3$, 15 parts by weight of vinyl chloride-vinyl acetate copolymer, 15 parts by weight of polyurethane elastomer, 8 parts by weight of carbon black, 120 parts by weight of methyl ethyl ketone, and 2 parts by weight of a lubricant were sufficiently mixed in a sand mill to obtain a magnetic paint. To the magnetic paint was added 15 parts by weight of polyisocyanate.

This paint was applied onto a 15 μm thick polyester film having a specified wt% of specified oxide particles with a specified average size dispersed therein, and dried to have a dry thickness of 5 μm. Thereafter, the coated film was calendered and slit to obtain magnetic tapes for video tape recorder with a predetermined width.

EXAMPLE 1

The general procedure of the example method above was performed using a polyester film containing 0.1 wt% of dititanium trioxide with an average size of 0.8 μm, thereby obtaining magnetic tapes for a video tape recorder.

EXAMPLE 2

The general procedure of Example 1 was repeated using a polyester film containing 10 wt% of dititanium trioxide with an average size of 2.5 μm, thereby obtaining magnetic tapes for a video tape recorder.

EXAMPLE 3

The general procedure of Example 1 was repeated using a polyester film containing 3.5 wt% of dititanium trioxide with an average size of 0.1 μm, thereby obtaining magnetic tapes for a video tape recorder.

EXAMPLE 4

The general procedure of Example 1 was repeated using a polyester film containing 8 wt% of titanium monoxide with an average size of 1.0 μm, thereby obtaining magnetic tapes for a video tape recorder.

EXAMPLE 5

The general procedure of Example 1 was repeated using a polyester film containing 0.05 wt% of titanium monoxide with an average size of 0.05 μm, thereby obtaining magnetic tapes for a video tape recorder.

COMPARATIVE EXAMPLE 1

The general procedure of Example 1 was repeated using a polyester film containing 0.05 wt% of calcium carbonate particles with an average size of 1.0 μm, thereby obtaining magnetic tapes for a video tape recorder.

COMPARATIVE EXAMPLE 2

The magnetic paint of Example 1 was applied onto a polyester film free of any particles. Thereafter, a paint of vinyl chloride-vinyl acetate copolymer comprising 20 wt% of calcium carbonate particles with an average size of 1.0 μm, and 15 wt% of kaolin particles with an average size of 1.0 μm was applied to the polyester film on the surface bearing no magnetic layer in a thickness of 2 μm, followed by calendering and slitting to obtain magnetic tapes for a video tape recorder with a predetermined width.

The magnetic tapes obtained in the above examples and comparative examples were set in a reproducing apparatus to determine an electromagnetic characteristic (chrominance signal S/N), smoothness (average surface roughness), travelling performance (coefficient of kinetic friction), degree of abrasive scratches or defects (wear resistance), and the number of dropouts where a video signal of −20 dB is kept for at least 5 microseconds. The results are shown in the following table.

TABLE

| | Color S/N (dB) | Average Surface Roughness (μm) | Coefficient of Kinetic Friction | Wear Resistance | Dropouts per Minute |
|---|---|---|---|---|---|
| Example | | | | | |
| 1 | +3.1 | 0.015 | 0.10 | no scratch | 35 |
| 2 | +2.9 | 0.019 | 0.07 | no scratch | 32 |
| 3 | +3.2 | 0.011 | 0.10 | no scratch | 28 |
| 4 | +3.0 | 0.014 | 0.09 | no scratch | 25 |
| 5 | +3.5 | 0.009 | 0.10 | no scratch | 27 |
| Comparative Example | | | | | |
| 1 | +2.8 | 0.025 | 0.11 | some scratches | 50 |
| 2 | +2.8 | 0.030 | 0.22 | some scratches | 30 |

The above results demonstrate that the magnetic tapes of the present invention have an improved chrominance signal S/N characteristic over the comparative tapes and include excellent surface roughness. Better travelling performance and wear resistance are also attained, with a less number of dropouts involved.

The magnetic tapes obtained in Example 1 and Comparative Examples 1 and 2 were each subjected to repeated reproduction operation up to 500 cycles to determine a change of the coefficient of kinetic friction. The results of this test are shown in the sole FIGURE, revealing that the tape of the invention has a lower coefficient of kinetic friction than the comparative tapes when repeatedly reproduced, and the increase of the coefficient is more gentle for the tape of the invention as compared with the tapes of the comparative examples.

What is claimed is:

1. A magnetic recording medium which comprises a flexible support and a magnetic layer formed on the flexible support, the flexible support being made of a resin composition which comprises a thermoplastic resin and particles selected from the group consisting of titanium monoxide and dititanium trioxide dispersed in the thermoplastic resin in an amount of 0.03 to 10 wt% of the composition, said particles having an average size below 2.5 μm.

2. In a magnetic recording medium which comprises a flexible support and a magnetic layer formed on the flexible support, the flexible support being made of a resin composition which comprises a thermoplastic resin and particles of titanium oxide which are dispersed in the thermoplastic resin in an amount of 0.03 to 10 wt% of the composition and which have an average size below 2.5 microns, the improvement characterized in that said titanium oxide is selected from the group consisting of titanium monoxide and dititanium trioxide.

3. The magnetic recording medium according to claim 1, wherein the particles have an average size ranging from 0.05 to 1.0 μm.

* * * * *